United States Patent [19]

Smith

[11] Patent Number: 4,646,546

[45] Date of Patent: Mar. 3, 1987

[54] LOCK AND SEAL FOR DYEING SPINDLE

[75] Inventor: Ashley P. Smith, Stanley, N.C.

[73] Assignee: Gibson Machine Company, Gastonia, N.C.

[21] Appl. No.: 669,933

[22] Filed: Nov. 9, 1984

[51] Int. Cl.⁴ .............................................. B06B 23/04
[52] U.S. Cl. .................................. 68/212; 242/118.6; 403/259; 411/554; 24/663
[58] Field of Search ............... 68/198, 212; 242/118.6; 403/259, 261; 411/554, 552; 24/663; 277/53

[56] References Cited

U.S. PATENT DOCUMENTS

| | | | |
|---|---|---|---|
| 940,917 | 11/1909 | Asquith | 24/590 |
| 1,375,207 | 4/1921 | Carrey | 277/53 X |
| 1,567,750 | 12/1925 | Profitlich | 277/53 |
| 3,245,276 | 4/1966 | Wall | 24/590 X |
| 3,422,977 | 1/1969 | Shaw | 24/590 X |
| 3,650,494 | 3/1972 | Hutchinson | 242/118.61 |
| 3,731,502 | 5/1973 | Stearns et al. | 68/198 |
| 3,777,516 | 12/1973 | Tigges | 68/198 |
| 4,398,322 | 8/1983 | Ewen | 24/590 |

FOREIGN PATENT DOCUMENTS

| | | | |
|---|---|---|---|
| 26617 | 4/1884 | Fed. Rep. of Germany | 24/590 |
| 221515 | 8/1908 | Fed. Rep. of Germany | 68/198 |
| 81916 | 2/1950 | Netherlands | 24/590 |
| 258659 | 5/1945 | Switzerland | 24/590 |

Primary Examiner—Philip R. Coe
Assistant Examiner—Frankie L. Stinson
Attorney, Agent, or Firm—Clifton Ted Hunt

[57] ABSTRACT

A spindle nut remains attached to a dye spindle for repeated dye operations and includes radially projecting cam surfaces for successively guiding and locking a lock ring against outward movement relative to the spindle nut at the beginning of successive dye operations. A pressure plate engages the outermost yarn package on the dye spindle and a tube is fixed to the pressure plate and extends outwardly about the spindle toward the lock ring at the beginning of each dye operation, terminating in spaced relation from the lock ring. The pressure obtained during each successive dye operation moves the pressure plate outwardly until the tube engages the lock ring to hold the yarn packages on the spindle during dyeing. At the end of each dyeing operation, the pressure plate and yarn packages are removed from the spindle after rotating the lock ring a partial revolution to disengage it from a locking cam surface on the spindle nut and position the lock ring for easy removal from the spindle nut by lifting it axially from the spindle nut.

7 Claims, 12 Drawing Figures

LOCK AND SEAL FOR DYEING SPINDLE

BACKGROUND OF THE INVENTION

In the dyeing of yarn, it is known to support a plurality of yarn packages on each of a plurality of vertically disposed spindles. Several yarn packages are loaded on each spindle and placed under compression. A retainer is placed against the last package loaded on each spindle to maintain the yarn packages under compression during dyeing.

The spindles are hollow and have a plurality of openings along their length providing communication between the interior of the spindle and the interior of the dye kettle. During the dyeing, dye liquor is forced upwardly through the hollow spindles and outwardly through the openings and through the yarn packages on each spindle. The process is reversed while dyeing so that the liquor is forced from the interior of the dye kettle through the yarn packages, through the openings in the spindles, and downwardly through the hollow spindles and out of the dye kettle. The packages of yarn are relaxed during the dyeing process.

Some prior art mechanisms for securing yarn packages in a compressed condition on the spindles require an operator to place a pressure plate on the end package and then thread a nut-like fastener on top of each spindle. This requires an interruption of the carrier loading cycle and subjects the operator to the risk of serious injury by having his hand and arm within the compression unit for a minimum of five seconds while manipulating the nut to a tightened position over approximately two inches of threaded stud.

Prior attempts to eliminate the inefficient production and the dangerous manipulation of the nut-like fastener have been only partially successful. See, for example, U.S. Pat. No. 3,777,516 issued Dec. 11, 1973 to Gerhard Tigges entitled CLOSING DEVICE IN PARTICULAR FOR DYEING SPINDLES. The Tigges device still requires manipulation of threaded members and consequent inefficiency in production. See also U.S. Pat. No. 3,731,502 issued May 8, 1973 to John M. Stearns et al. entitled RELEASABLE LOCKING ASSEMBLY. The Stearns et al. locking assembly requires special tooling and is not adaptable to existing spindles.

The dyeing of the yarn using pressurized dye liquor forces successive inward and outward flow of the dye liquor through each of the spindles in the dye kettle. The failure to contain the dye liquor beneath the top pressure plate is another shortcoming in the prior art with which the present invention is concerned. Sealing devices of the prior art are inefficient because they all allow some leakage and because most of them are expensive and complex mechanisms requiring time consuming manipulation to function.

SUMMARY OF THE INVENTION

The lock and seal of the present invention includes an internally threaded spindle nut which is threadably registrable with the externally threaded stud on top of the conventional dye spindle. The spindle nut portion of this invention is threadably connected to the threaded stud on the conventional dye spindle in advance of the dyeing operation and, unlike the prior art spindle nut, remains connected to the spindle after the dyeing is completed for use in successive dyeing operations. The present spindle nut of this invention becomes, in effect, a part of the dye spindle.

The spindle nut includes the cam portion of an automatic lock. A sealing mechanism utilizes a pressure plate like that used in the prior art for compressing yarn packages on a dye spindle. The sealing mechanism includes a top ring which has a plurality of inwardly projecting locking pins spaced above the pressure plate and positioned for instant and positive locking engagement with the cams on the spindle nut permanently threaded to the dye spindle. A compression spring and sealing tubes extend between the pressure plate and the top ring of the sealing assembly.

With the spindle nut and its integral cams permanently joined to the dye spindle for use in repeated dyeing operations, a plurality of yarn packages are positioned on the dye spindle in the usual manner. Thereafter, the yarn packages are compressed together on the spindle in the usual manner and the top ring of the sealing assembly is simply dropped over the cammed portion of the spindle nut and the pressure plate is automatically locked against the compressed yarn packages. Downward movement of the top ring relative to the spindle nut brings the inwardly projecting locking pins into engagement with guide cam surfaces on the upper end of the spindle nut. These upper cam surfaces first engaged by the locking pins guide the pins downwardly into engagement with positioning cams spaced below the guide cams. The pressure plate is thus united with the spindle nut throughout the dyeing operation as the positioning cam directs the pins on the ring into locking engagement with the lower edge of the guide cam responsive to upward movement of the pressure plate and the top ring by the compressed yarn packages.

When the dyeing of the yarn is completed and the fluid pressure within the dye kettle is diminished, the pressure plate may be quickly removed from the spindle by manually rotating the top ring until the pins register with spaces between the guide cams, permitting the top ring and its attached pressure plate to be lifted upwardly and removed from the spindle nut with a single simple motion of slightly rotating and lifting the top ring and pressure plate relative to the spindle nut.

The escape of dye liquor while dyeing is minimized by a plurality of concentric tubes extending between the top ring and the pressure plate. One of the tubes is connected to the pressure plate and is movable into sealing engagement with the top ring responsive to upper movement of the pressure plate by the compressed yarn. Another tube is connected to the pressure plate and extends in closely spaced relation or in engagement with a plurality of laminar ridges spaced beneath the positioning cams on the spindle nut. The pressurized dye liquor is progressively retarded as it flows between the spaced ridges and the tube so that only a minimum amount of dye liquor is permitted to escape about the spindle nut during the dyeing operation.

It is an object of the present invention to provide an effective locking mechanism for dye spindles which automatically locks the pressure plate against upward movement beyond a predetermined point without the manipulation of any type of mechanism by the operator, and which automatically releases the pressure plate when the operator slightly rotates the ring and lifts the ring and its attached pressure plate relative to the spindle nut.

It is another object of the invention to provide a sealing mechanism for retarding the escape of pressurized dye liquor from about the dye spindle during the dyeing operation, and which sealing mechanism becomes automatically operable without attention from an operator upon the pressure plate being positioned over the carrier spindle and restrained against upward movement beyond a predetermined point.

It is a still further object of the invention to provide a lock and seal which functions to lock the pressure plate on a carrier spindle and retard the upper flow of dye liquor without any moving parts requiring the attention of an operator.

DETAILED DESCRIPTION OF THE INVENTION

Figure 1:
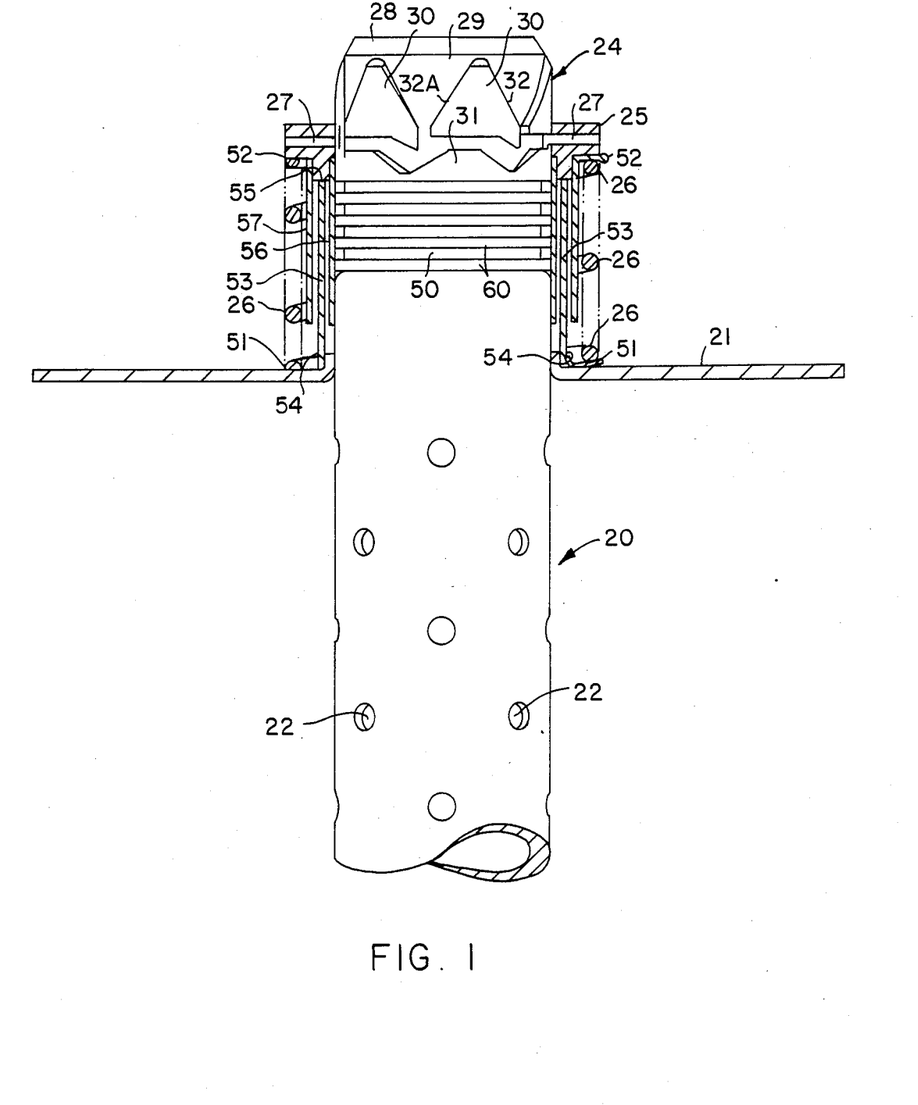
FIG. 1 is an environmental view, with parts broken away, illustrating a dye spindle and the spindle nut of this invention in elevation and the lock ring and seal mechanism of this invention operatively connected thereto and shown in section.
Figure 2:
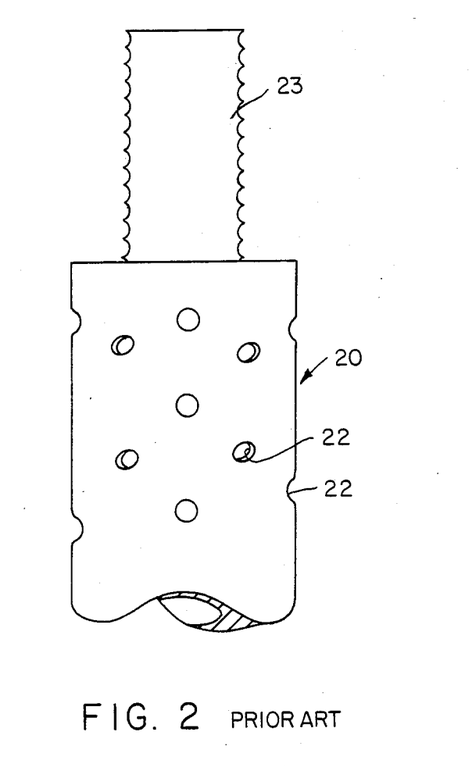
FIG. 2 is an elevational view of a prior art dye spindle, with parts broken away.

Referring more specifically to the drawings, a conventional dye spindle with which the present invention is used is broadly illustrated at 20. In practice, a plurality of such dye spindles are submerged in a dye kettle with each spindle supporting a plurality of yarn packages held on the spindle under compression. A pressure plate 21 engages the last yarn package loaded on each spindle and the pressure plate is held against upward movement relative to the spindle by a desired means. Referring to FIG. 2, the prior art dye spindle 20 is shown removed from the environment of FIG. 1. The spindle 20 is hollow and has a plurality of holes 22 providing communication between the interior of the hollow spindle 20 and the interior of the dye kettle, when in use. Dye liquor is forced under pressure upwardly through the hollow spindle and outwardly through the holes 22 in the walls of the spindles to permeate the yarn carried by the spindle as it passes into the dye kettle. The process is reversed while dyeing to force the dye liquor from the interior of the dye kettle through the yarn and inwardly through the holes 22 and then downwardly and outwardly from the hollow spindles to complete the dyeing operation.

As illustrated in FIG. 2, each of the hollow dye spindles 20 has an elongated threaded stud or boss 23 formed integral with the spindle 20 and projecting upwardly therefrom in the drawings. The threaded boss 23 was originally provided for reception of a similarly threaded nut N (FIG. 2) which was manually threaded on the boss 23 during a pause in the dyeing operation while a compression unit applied pressure to compress the yarn and a worker positioned the pressure plate against the last package loaded and laboriously threaded the nut N on the boss 23.

The present invention utilizes the prior dye spindle 20 and its threaded boss 23 but the nut N of the prior art which was laboriously threaded on the boss 23 prior to each dyeing operation and laboriously removed at the completion of dyeing to get the dyed yarn off of the spindle has been discarded in favor of the present spindle nut, broadly indicated at 24, and which may be permanently threaded on the boss 23 of the dye spindle 20 to remain with the spindle indefinitely through successive dyeing operations.

A plurality of yarn packages, not shown, and the pressure plate 21 are positioned on the carrier spindle 20 after it has been equipped with the spindle nut 24 and the pressure plate and yarn packages are compressed tightly against one another by appropriate equipment as before. However, it is no longer necessary to laboriously thread a nut in place to hold the pressure plate and the yarn packages on the spindle.

Instead, according to this invention, the pressure plate 21 is attached to a lock ring 25 by a spring 26. The lock ring 25 includes a plurality of inwardly projecting lock pins 27. The spindle nut 24 includes a lock portion comprising a plurality of circumferentially spaced guide cams 30 and a positioning cam 31 projecting outwardly from the surface 29 of the spindle nut 24. There are six guide cams 30 on the spindle nut 24 in the illustrated embodiment of the invention and the positioning cam 31 is illustrated as an annular cam spaced below the guide cams 30.

Figure 4:
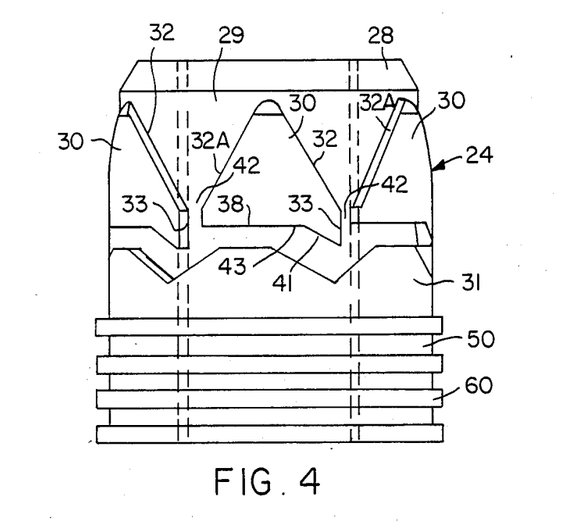
FIG. 4 is an elevational view of the spindle nut, illustrating the cam portion of the lock and illustrating the spaced annular laminar ridges which serve as part of the seal.
Figure 5:
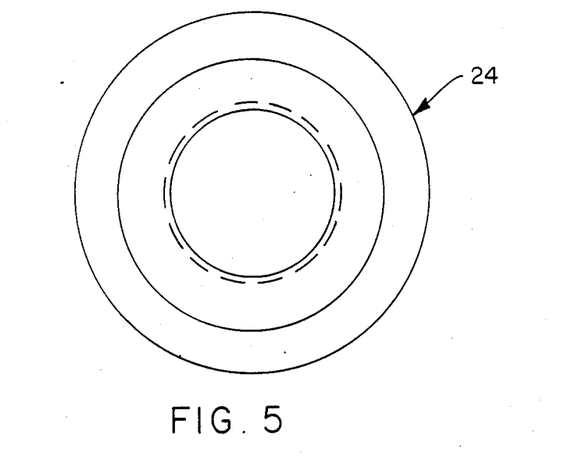
FIG. 5 is a top view of the spindle nut shown in FIG. 4.
Figure 6:
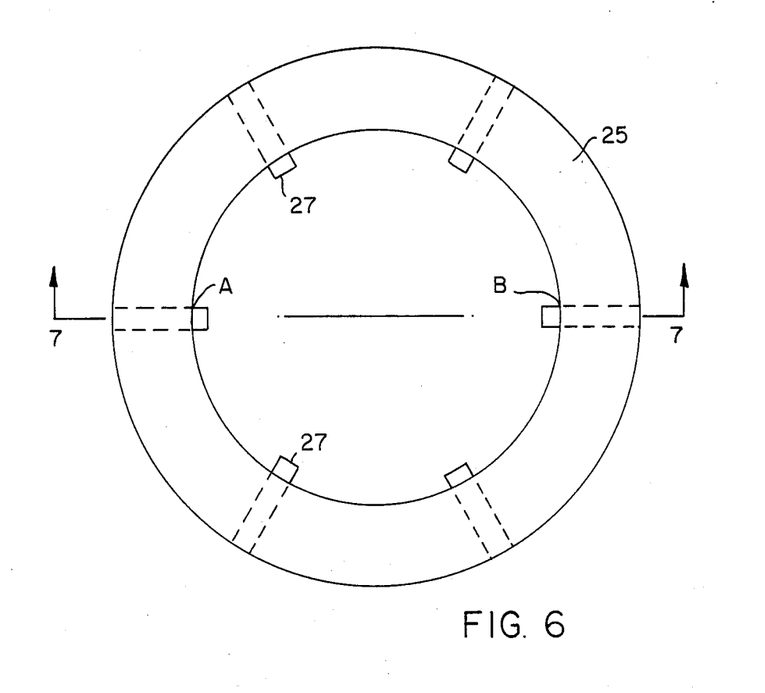
FIG. 6 is a plan view of the lock ring and pins which cooperate with the cams shown in FIG. 4 to lock the pressure plate on the spindle.
Figure 7:
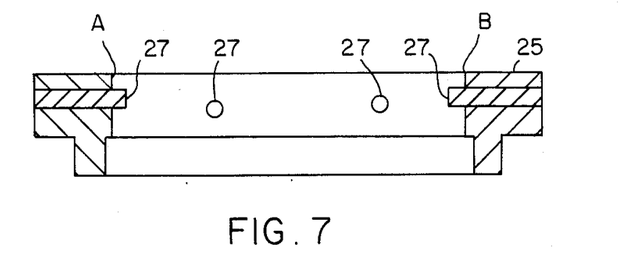
FIG. 7 is a sectional view taken substantially along the line 7—7 in FIG. 5.
Figure 8:
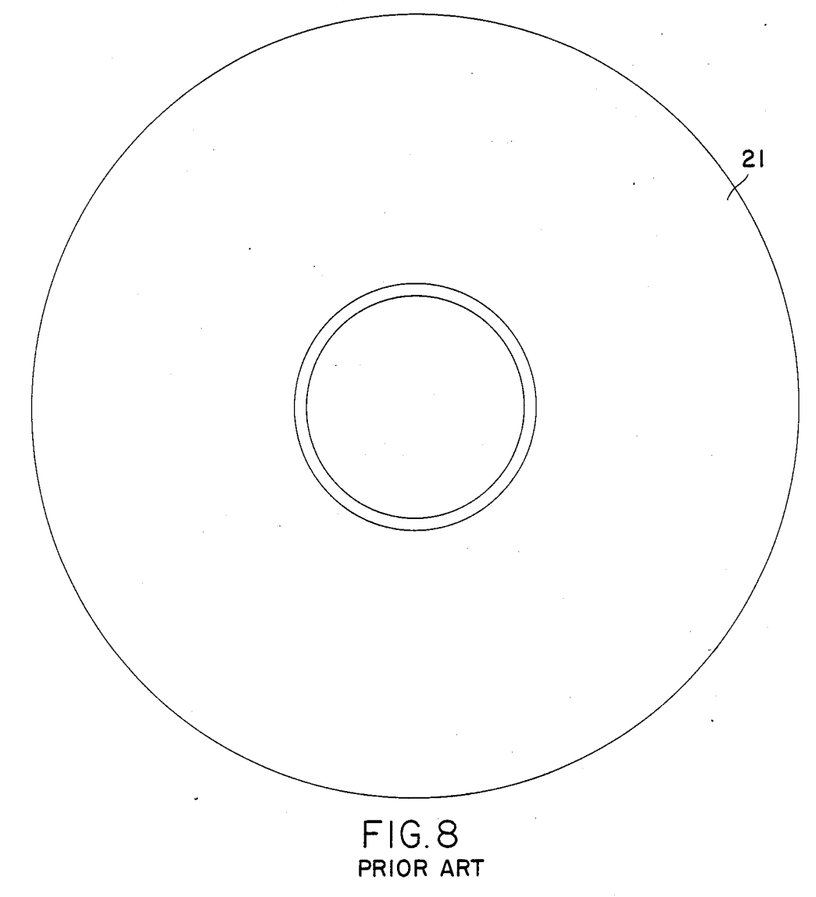
FIG. 8 is a plan view of the pressure plate.
Figure 9:
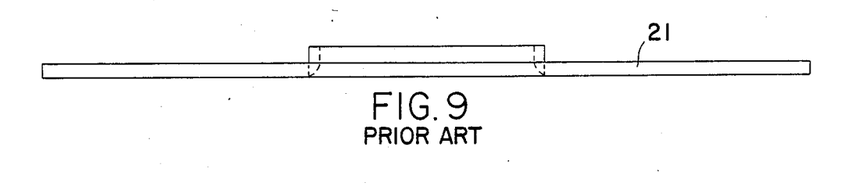
FIG. 9 is an elevational view of the pressure plate shown in FIG. 8.

The inner diameter of the ring 25 between the points A and B in FIGS. 6 and 7 is large enough to freely pass over the cams on the spindle nut 24. The pins 27 extend inwardly of the ring 25 a distance sufficient that opposed pins in FIG. 6 are spaced apart far enough to freely pass over the surface of the spindle nut 24 but the opposed pins are spaced sufficiently close to each other that the pins engage the operative or working surfaces of the cams. Thus, when the lock ring 25 with its pressure plate 21 attached thereto is dropped over a spindle nut 24 on a dye spindle 20, the pins 27 engage a tapered surface 28 at the top of the spindle nut 24 which aligns the pins with the surface 29 of the nut 24. The pins then move downwardly across the surface 29 to working surfaces 32 on the triangularly-shaped cams 30 (FIGS. 4 and 12) and the working surfaces 32 guide the pins at an angle across the body surface 29 of the spindle nut 24 to a vertical working surface 33 on each cam 30. The vertical working surface 33 of each cam 30 guides the pins 27 vertically downwardly into engagement with an inclined working surface 34 on positioning cam 31. The working surface 34 extends downwardly and terminates at a point 35 in a valley beneath the working surface 32 previously traversed by the pin 27. The valley 35 is at the juncture of downwardly inclined surface 34 with an upwardly inclined surface 36 on positioning cam 31. Upwardly inclined surface 36 extends from valley 35 to its juncture with a plateau 37 spaced beneath the lower working surface 38 of the corresponding cam 30.

Figure 12:
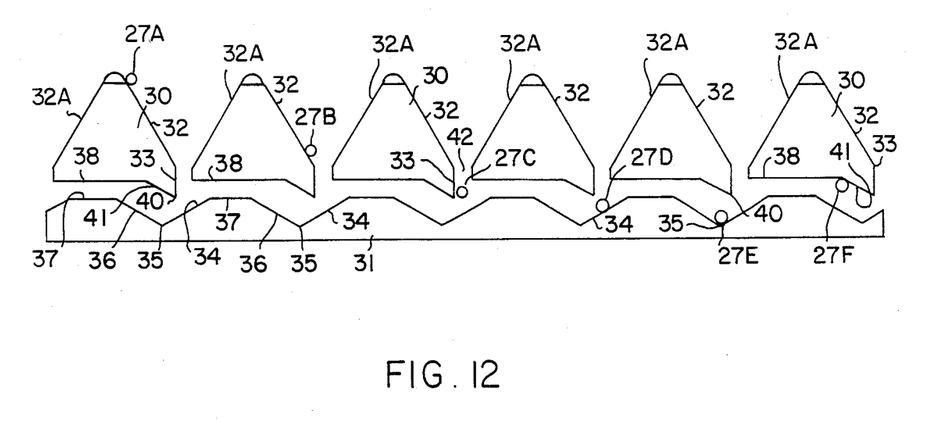
FIG. 12 is a profile of the annular cams shown in FIG. 11.

FIG. 12 illustrates the profile of cams 30 and the positioning cam 31 and it will be noted that whether the working surfaces 34 and 36 on positioning cam 31 extend up or down depends on the direction of travel around the nut 24. The pins 27 may move down either working surface 32 or working surface 32A of any cam 30. Both of the surfaces 32 and 32A guide pins 27 to a downwardly inclined surface 34. Surface 32 guides pins 27 to an inclined surface 34 extending to a valley 35 beneath the same cam 30 traversed by pin 27, while inclined surface 32A on each cam 30 guides pins 27 to an inclined surface 34 extending to a valley 35 beneath an adjacent cam 30 to that traversed by pin 27.

The vertical surface 33 extends beneath the lower working surface 38 on each cam 30 and terminates at a point 40 defined by the surface 33 and a working surface 41 extending upwardly from the point 40 to the lower working surface 38. It will be noted that each of the valleys 35 in the positioning cam 31 is positioned beneath the upwardly inclined working surface 41 on the one cam 30 above that valley and that the vertical working surface 33 on that one cam 30 is spaced from the adjacent cam 30 and overlies the inclined working surface 34 on the cam 31 which terminates in the valley beneath said one cam.

A typical path of a pin 27 is illustrated in FIG. 12 by successive positions 27A through 27F. Of course, in actual practice a single pin 27 may traverse either surface 32 or 32A of only a single cam 30 and the corresponding portion of the cam 31 therebeneath, but for this illustration it is assumed the pin traverses surface 32. Still referring to FIG. 12, 27A illustrates the position of the pin 27 as it begins to move down the surface 32. The pin continues to move down inclined surface 32 to the position of 27B near the lower end of surface 32. The pin then moves through the space 42 between the cams 30 as indicated at 27C. The pin continues to drop vertically until it reaches position 27D on the inclined surface 34 on cam 31, which guides the pin to position 27E in the valley 35 spaced inwardly of the point 40 on the cam 30 traversed by the pin. The expansion of the yarn packages against the pressure plate moves the lock ring 25 and its pins 27 upwardly from the position of 27E to the inclined wall 41 on cam 30. The pin stops as at 27F at a predetermined locking point 43 defined by the juncture of inclined surface 41 with lower surface 38 of its cam 30 to lock the pressure plate and yarn packages on the spindle until the force on the pressure plate is released.

THE SEAL

Figure 3:
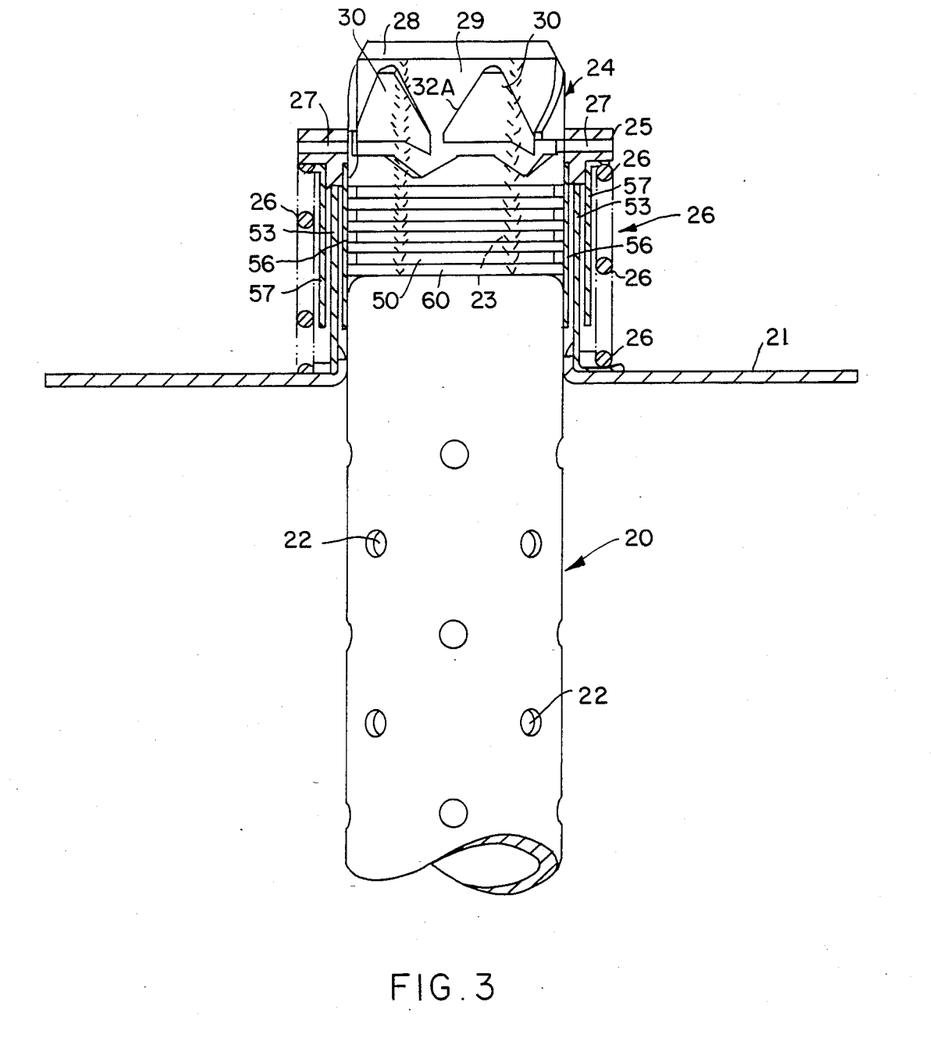
FIG. 3 is a view similar to FIG. 1 but showing the threaded connection of the spindle nut with the dye spindle in dotted lines.

The locking of the pressure plate 21 to the spindle 20 automatically and simultaneously positions the seal of this invention about the upper end of the spindle where it functions to significantly retard the flow of dye liquor upwardly about the spindle, without any attention from the operator. Referring now to FIGS. 1 and 3, the pressure plate 21 is fastened to the lock ring 25 by the spring 26. The lower end of the spring 26 is welded as at 51 to the pressure plate 21 and the upper end of the spring 26 is welded as at 52 to the lock ring 25. A first sealing tube 53 is welded as at 54 to the pressure plate 21 and extends upwardly therefrom in the drawings beyond the spindle 20 and toward the lock ring 25. The upper edge of the sealing tube 53 is shown in abutting relation to a depending flange 55 of lock ring 25 but the tube 53 is not connected with the ring 25. It is urged into abutting and sealing relation with flange 55 by force exerted against the pressure plate 21 by the compressed yarn column during the dyeing operation.

Seated against and secured to opposed surfaces of flange 55 on lock ring 25 are an inner sealing tube 56 and an outer positioning tube 57. The inner sealing tube 56 and the outer positioning tube 57 are spaced on either side of the first sealing tube 53, and the lower ends of the tubes 56, 57 extend beyond the spindle nut 24 into juxtaposition with the spindle 20 but are spaced from the pressure plate 21 when it is in its uppermost position as shown in FIGS. 1 and 3.

The spindle nut 24 includes a seal portion comprising a plurality of laminar ridges 60 formed integral therewith and projecting circumferentially from a surface 50 of the nut 24. There are four laminar ridges 60 in the illustrated embodiment of the invention and each ridge 60 is closely spaced from the inner sealing tube 56 to define a narrow orifice 61. The laminar ridges 60 cooperate with the inner tube 56 to form an effective seal against the escape of dye liquor under pressure during the dyeing operation. Pressurized dye liquor is forced upwardly through the orifice 61A between the lower most laminar ridge 60A in FIG. 10 into the relatively large expansion area 62A above ridge 60A and between ring 56 and surface 50 of the spindle nut 24. Movement of the pressurized liquid from the orifice 61A into the expansion area 62A causes rapid expansion of the fluid and a corresponding decrease in the energy or head of the liquid.

Figure 10:
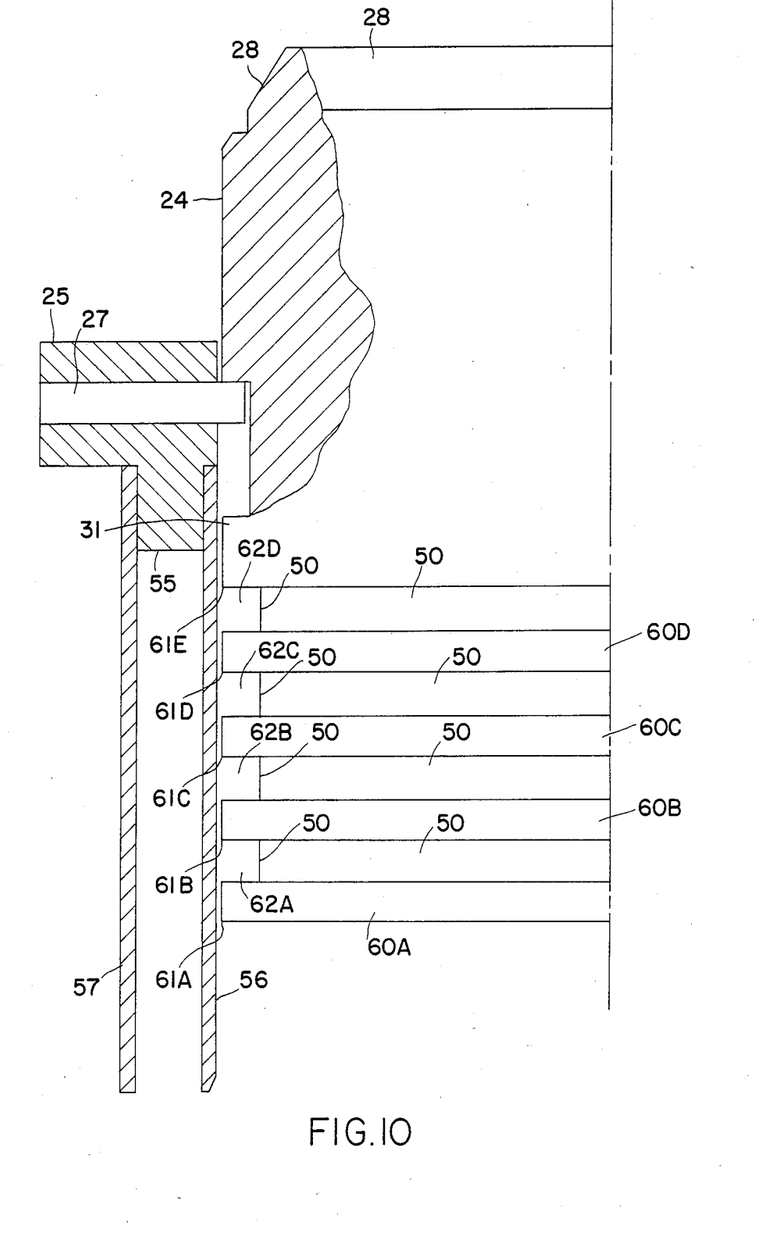
FIG. 10 is an enlarged sectional view, with parts broken away, illustrating the cooperation of the laminar ridges with the inner tube to retard the escape of dye liquor.
Figure 11:
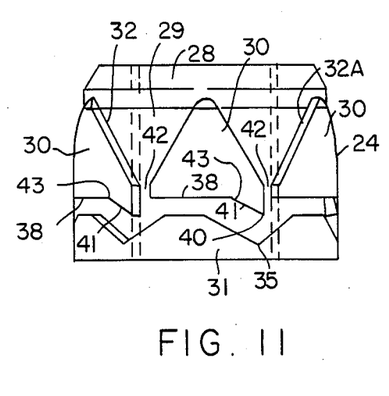
FIG. 11 is an elevation of the cam portion of the spindle nut.

It is to be understood that the drawing in FIG. 10 is illustrative of the actual spacing of the inner sealing tubes 56 from the ridges 60. The inner sealing tube 56 is in fact spaced from the ridges sufficiently to enable the tube 56 to pass freely over the top of the spindle 20 as the lock ring 25 traverses the cams 30 on the spindle nut. The ridges 60 are of the same diameter as the spindle 20, as shown in FIGS. 1 and 3. A space or orifice 61 of about 0.005 of an inch (0.127 mm) has been found to provide sufficient clearance and a suitably sized orifice.

In the illustrated embodiment the expansion area 62 between the ridges 60 and between the sealing tube 56 and surface 50 of the cam lock measures about one eighth of an inch (0.317 cm) in each direction. The effectiveness of the seal provided by the juxtaposition of the laminar ridges 60 and the inner sealing tube 56 is demonstrated by known physical principles: (1) Pressurized fluid loses head or energy when it flows through a restricted space or orifice, as at 61; (2) the fluid loses head or energy when it flows from an orifice (61) into an enlarged area such as the expansion area 62; (3) fluid loses head or energy as it moves upwardly; and (4) fluid loses head or energy because of friction generated between the molecules of the fluid and because of the friction generated by contact of the fluid with the surfaces which contain the fluid. Each of these four components resulting in the loss of head or energy is repeated several times as the pressurized dye liquor moves upwardly through the several orifices 61 and expansion areas 62A-62D. The passage of fluid through the lowermost orifice 61A and into the enlarged area 62A reduces the head or energy available to pass through the next orifice 61B. There is increasing loss of head or energy as the dye liquor passes through successive orifices and expansion areas 61B, 62B, 61C, 62C, 61D and 62D.

Consequently there is very little energy available to force dye liquor upwardly and very little dye liquor able to escape through the uppermost orifice 61E defined by the tube 56 and the annular cam 31 on the spindle nut 24.

The most significant components for the loss of head or energy as the dye liquor passes upwardly are the passage of the fluid through the orifices and into the expansion areas. It is calculated that the passage of the fluid through each of the described orifices consumes about five percent of the head or energy of the fluid and the rapid expansion of the fluid in the described expansion areas 62 consumes about fifty percent of the head or energy. It can thus be seen that the passage of the fluid through these successive orifices and expansion areas consumes over ninety-seven percent of the energy by the time the fluid reaches orifice 61E. It is contemplated that the sizes of the orifices and expansion areas may be changed within the spirit of the invention, and the percentages of head loss may change accordingly.

The small loss of dye liquor through the seal of this invention is competitive with the loss of dye liquor through any known seal heretofore used with carrier spindles in the dyeing of yarn. The efficiency of the present seal is at least as good as the prior known seals and the quick and effortless placement of the seal in operative position simultaneously with the locking of the compressed yarn packages on the spindle is a significant advance in the art.

There is thus provided a combination lock and seal which is operative with no moving parts to simultaneously lock the packages on the spindle in a compressed state and to seal the top of the spindle against significant loss of dye liquor. Realizing that the spindle nut of this invention becomes a permanent part of the spindle and remains in place for successive dyeing operations, the positioning of the pressure plate and the sealing mechanism on the spindle nut after the spindle is loaded requires only a fraction of the operator's time that has been previously required to lock the packages on the spindle and seal the top of the spindle with prior known mechanisms.

Although specific terms have been employed in the drawings and specification, they are used in a descriptive sense only and not for purposes of limitation.

I claim:

1. A locking device for releasably retaining a plurality of yarn packages beneath a pressure plate on a vertically disposed spindle, said locking device comprising a first locking member fixed in use to the end of the spindle adjacent the side of the pressure plate opposite the yarn packages and including a free end projecting outwardly beyond the pressure plate, a second locking member movable over the free end of the first locking member into surrounding relation with the first locking member, said second locking member including opposed pins extending inwardly toward each other and terminating on opposite sides of the first locking member, means on the first locking member for directing the pins by gravity into position to be locked with the first locking member responsive to outward pressure against the second locking member, means on the first locking member for locking the second locking member against outward movement relative to the first locking member, and means on the first locking member enabling manual removal of the second locking member from the first locking member in the absence of outward pressure against the second locking member.

2. A structure according to claim 1 wherein the end of the first locking member opposite the spindle is tapered inwardly to facilitate movement of the second locking member onto the free end of the first locking member.

3. A structure according to claim 1 including a sealing tube fixed to the pressure plate and extending upwardly about the spindle for sealing engagement with the lock ring during a dyeing operation.

4. A structure according to claim 3 including an inner sealing tube and a positioning tube spaced on either side of the sealing tube and extending downwardly from the lock ring toward the pressure plate but terminating in spaced relation from the pressure plate before a dyeing operation.

5. A structure according to claim 4 wherein a plurality of annular ridges project circumferentially from the spindle nut between the positioning cam and the spindle, and said ridges extending radially into closely spaced relation to the inner sealing tube to define a seal portion.

6. A quick release lock for use on conventional dyeing spindles having a perforated body portion for reception of a plurality of yarn packages to be dyed and a threaded stud extending axially from one end for reception of a spindle nut, said lock comprising a spindle nut threadably engageable with the threaded stud on the spindle, a pressure plate surrounding the spindle and engageable with the last yarn package placed on the spindle, a lock ring engageable with the spindle nut, a spring fixed to the lock ring and the pressure plate and extending therebetween, said spindle nut including a plurality of guide cams, positioning cams and locking points extending annularly about the spindle nut and protruding radially therefrom, a plurality of pins extending radially inwardly from the lock ring and engageable with the guide cams, positioning cams, and locking points protruding radially from the spindle nut, the guide cams being annularly spaced from each other to define spaces through which the pins on the lock ring may be manually moved to remove the lock ring and pressure plate from the spindle, a sealing tube fixed to the pressure plate and extending upwardly about the spindle for engagement with the lock ring during a dyeing operation, and an inner sealing tube and a positioning tube spaced on either side of the sealing tube and extending downwardly from the lock ring toward the pressure plate but terminating in spaced relation from the pressure plate before a dyeing operation.

7. A structure according to claim 6 wherein a plurality of annular ridges project circumferentially from the spindle nut between the positioning cam and the spindle, and said ridges extending radially into closely spaced relation to the inner sealing tube to define a seal portion.

* * * * *